June 20, 1933.  J. C. SCHELLIN  1,914,961

HOSE COUPLING REENFORCING MEANS

Filed May 28, 1932

Inventor:
John C. Schellin
By Hiram Swartz Atty.

Patented June 20, 1933

1,914,961

UNITED STATES PATENT OFFICE

JOHN C. SCHELLIN, OF WOOSTER, OHIO

HOSE COUPLING REENFORCING MEANS

Application filed May 28, 1932. Serial No. 614,100.

My invention relates to improvements in hose couplings, and particularly to improved means for strengthening the tail members of couplings and make it possible to use inferior and light weight alloys in the manufacture of expansion ring type couplings which are expanded over the terminal portion of the hose line by means of internal expansion rings.

Couplings for hose lines have heretofore been made of steel or bronze, or other heavy metallic substance, to afford the required strength and endure the wear and tear of service.

Such have necessarily been quite heavy and difficult to drag over uneven surfaces, or to be carried up on ladders in order to reach and extinguish a fire, and it is the principal object of my invention to remedy this defect, by the use of light weight material in the couplings without loss of strength.

I have found by experiment that by the insertion of one or more coils of spring steel, or other material of great lineal strength into the wall of the tail piece of the coupling circumferentially, the normal strength of the member is substantially increased, and at the same time the weight of the couplings, when thus constructed, may be reduced approximately one third by the use of light weight material in the bowl and tail piece.

I accomplish this improvement by inserting rings of great lineal strength in the mold during the casing process, so as to be substantially enclosed in the hose bowl for its reenforcement circumferentially, and thereby prevent breakage of the tail piece in the process of expanding the hose securing thimble outwardly—all as hereinafter set forth and stated in the appended claim.

My invention is illustrated by the accompanying drawing, in which similar letters and figures of reference indicate like parts.

Figure 1:
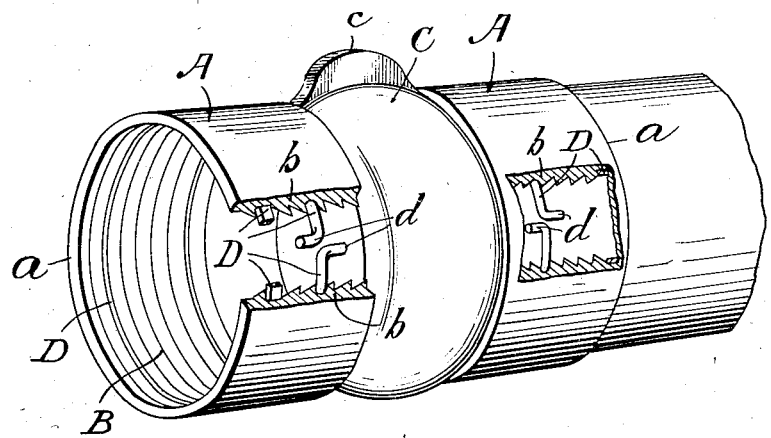
Figure 2:
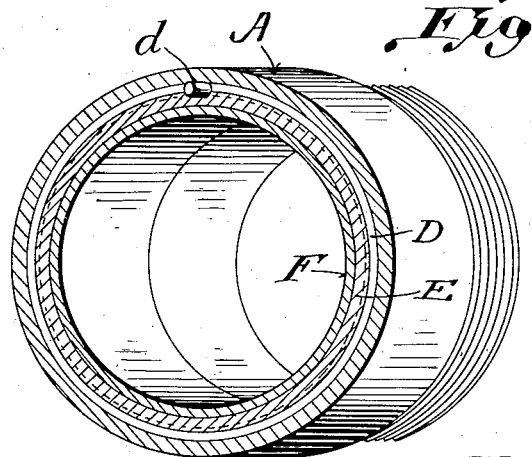

Referring thereto, Fig. 1 is a perspective view of a hose coupling embodying my invention, partly cut away to better show the interior of the device. Fig. 2 is a perspective view of one of the coupling members showing the outer end thereof in section.

Figure 3:
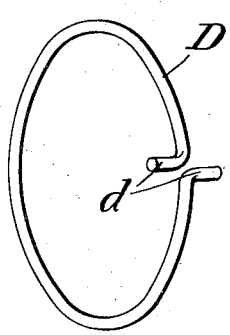
Figure 4:
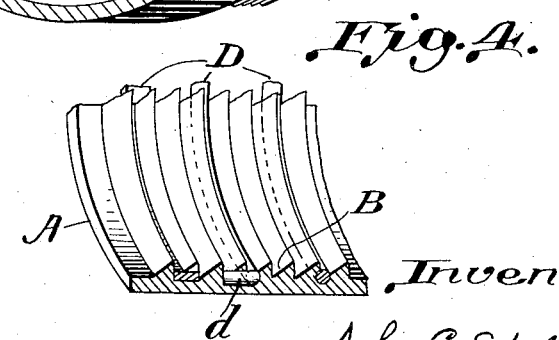

Fig. 3 is a detail view of a reenforcing ring detached; and Fig. 4 is a sectional view of a portion of the bowl member showing the reenforcing rings embedded therein.

In the drawing, A, A indicate the pair of end members or tail pieces of the coupling in normal connection with the swivel member C, partly cut away to show in section the reenforcing rings D having terminal hooks $d$ thereon, which secure the rings solidly in the tail piece casting, as shown in Fig. 4. The rings are preferably laid partly in the grooves B, which serve to grip the terminal portion of the hose line E, (Fig. 2) so that when the inner thimble F is expanded outwardly with the pressure required to firmly hold the hose E in the tail piece A, the reenforcing rings D resist the internal pressure sufficiently to prevent loosening or withdrawal of the hose from the coupling, and also prevent bursting of the tail piece by the expansion of the inner thimble F.

By such reenforcing means the use of inferior light weight alloys for the manufacture of expansion ring type hose couplings which are expanded over hose by means of internal expansion rings is made possible, without loss of strength, and with the advantages of lessened weight, and less expense thereby.

What I claim is—

In a hose coupling, the combination with a swivel member thereof, of a tail piece connected thereto terminating with a hose bowl, and one or more metal rings of superior lineal strength embedded circumferentially within the body of the bowl to reenforce the latter and prevent breakage when a hose terminus is forcibly expanded therein.

In witness whereof, I hereunto set my hand this 8th day of April, A. D. 1932.

JOHN C. SCHELLIN.